(No Model.)
O. LUGO.
PROCESS OF PURIFYING WATER GAS.
No. 315,953. Patented Apr. 14, 1885.
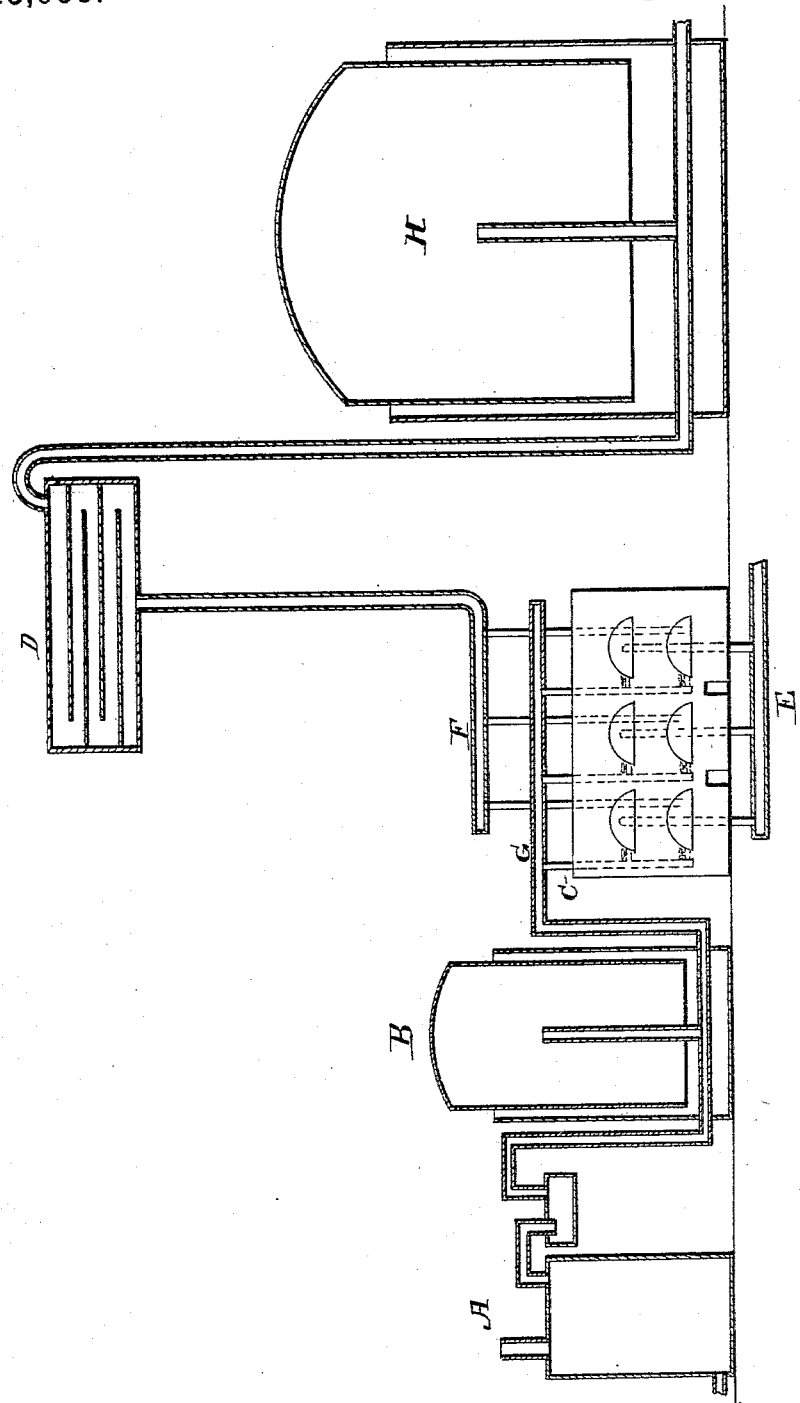
ATTEST.
J. Henry Kaiser.
Harry L. Amer.
INVENTOR.
Orazio Lugo
By David Mead
Atty
N. PETERS. Photo-Lithographer, Washington, D. C.

UNITED STATES PATENT OFFICE.

ORAZIO LUGO, OF NEW YORK, N. Y.

PROCESS OF PURIFYING WATER-GAS.

SPECIFICATION forming part of Letters Patent No. 315,953, dated April 14, 1885.

Application filed December 10, 1884. (No model.)

*To all whom it may concern:*

Be it known that I, ORAZIO LUGO, a citizen of the United States, and a resident of New York city, in the county of New York and State of New York, have invented certain new and useful Improvements in the Purification of Heating and Illuminating Gas, of which the following is a specification.

In the manufacture of "water-gas" by the decomposition of water vapors in contact with incandescent coal a product is obtained consisting mainly of hydrogen gas and carbonic oxide, which product is usually carbureted by any of the well-known methods to render it fit for illuminating purposes. The volumes of hydrogen and carbonic oxide in said gas are about equal, and it has long been a desideratum to find a practical and economical process for diminishing the proportion of carbonic oxide contained in said gas.

The object of my invention is the extraction of the said carbonic oxide, thereby increasing the heating and illuminating properties of said gas.

My invention consists in the use of heated oxide of iron as a medium for oxidizing the carbonic oxide into carbonic acid, thus reducing the ferric oxide to metallic iron, then re-oxidizing the metallic iron with steam. The process becomes continuous by passing a jet of steam over the heated metallic iron contained in retorts, or other suitable vessels, until the said iron is wholly or partially oxidized, collecting the hydrogen gas, and then passing through or over the oxide of iron the gas containing the carbonic oxide which it is desired to remove. The action of this alternate passing of steam and gas through the mass of divided iron is as follows: When steam in suitable volume is passed over heated iron the steam is decomposed, the oxygen combining with the iron forming oxide of iron, the hydrogen being set free and collected. When carbonic oxide or a mixture of gases containing free carbonic oxide is passed over heated oxide of iron in suitable volumes, the carbonic oxide is oxidized into carbonic acid, and the oxide of iron is reduced to metallic iron. These operations can be continued alternately without opening the retort or changing the contained iron, the products being hydrogen gas and carbonic acid. It is an easy matter to pass the gas so treated then through a caustic alkali, which removes the carbonic acid, the result being the production of a gas containing less carbonic oxide than that which is produced solely by the decomposition of water in contact with incandescent coal.

In order to carry my invention into effect, and to enable others skilled in the art to operate said invention, I describe the operation as follows, reference being had to the accompanying drawing, which represents a vertical longitudinal section of the apparatus partially in elevation.

The gas coming from the generator A or the holder B is passed through a heated retort or bench of retorts, C, containing oxide of iron, thence through the lime-boxes D. This is the important part of the invention, and it can be successfully carried on by first providing a retort or bench of retorts or other suitable receptacle wholly or partially filled with iron turnings, the iron being brought to a suitable heat by any convenient means. When steam, preferably superheated, is passed over said iron, it produces hydrogen gas and oxide of iron. The hydrogen gas so produced may be mixed with gas not purified, or it may be sent to a holder, thence either to a carburetor or through lime purifiers; second, when the mass of iron has been sufficiently oxidized, the steam is shut off, and the gas to be purified is allowed to flow through this mass of heated oxide of iron, and the flow is continued until the mass has been reduced to a metallic state by reason of the oxygen having combined with the carbonic oxide to form carbonic-acid gas; third, the iron having been kept suitably heated is then again subjected to the action of the steam until it is once more oxidized, as before mentioned; fourth, the carbonic acid produced by this operation is extracted by passing the gas through purifying-boxes containing lime.

It will be evident that by means of this invention a gas can be produced containing any desired percentage of carbonic oxide, to its total extraction, this depending upon the quantity of iron used in proportion to the gas passed over it.

It will be understood that in carrying out this invention for the extraction of the carbonic oxide it must take precedence of the carbureting.

In the diagram, E is the steam-pipe; F, outlet stand-pipe; G, inlet gas-pipe; D, lime-boxes.

The advantage of this invention is that while producing a gas freer from the objectionable and deleterious carbonic oxide the cost of the purer gas is not greater than the impure, for the reason that a greater volume of hydrogen gas is produced during the decomposition of steam and oxidation of the metallic iron than is the volume of carbonic oxide extracted and oxidized into carbonic acid by the reduction of the oxide of iron into metallic iron.

What I claim as my invention, and desire to secure by Letters Patent of the United States of America, is—

1. The process of removing the carbonic oxide from water-gas, which consists in first converting the carbonic oxide contained therein into carbonic acid by passing the said gas in contact with heated ferric oxide; second, in passing it in contact with caustic alkali, the metallic iron formed being constantly restored to the condition of ferric oxide by passing through it an oxidizing agent alternately with the gas.

2. The process of purifying water-gas, which consists in extracting the carbonic oxide from said water-gas by passing it in contact with heated ferric oxide, and then through a suitable alkali, and reoxidizing by means of steam the metallic iron which has been formed by the reducing action of the oxide of carbon, as set forth.

Signed at New York city, in the county of New York and State of New York, this 6th day of December, A. D. 1884.

ORAZIO LUGO.

Witnesses:
GEO. L. EVANS,
W. VAN BENSCOTEN.